US00RE35668E

United States Patent [19]

Albertson

[11] E Patent Number: Re. 35,668

[45] Reissued Date of Patent: Nov. 25, 1997

[54] SLUDGE COLLECTION APPARATUS AND METHOD

[76] Inventor: Orris E. Albertson, 1915 Wasatch Dr., Salt Lake City, Utah 84108

[21] Appl. No.: 621,689

[22] Filed: Mar. 26, 1996

Related U.S. Patent Documents

Reissue of:

[64] Patent No.: 5,435,924
Issued: Jul. 25, 1995
Appl. No.: 197,097
Filed: Feb. 16, 1994

[51] Int. Cl.[6] ..... B07D 21/06

[52] U.S. Cl. ..... 210/803; 210/525; 210/528

[58] Field of Search ..... 210/803, 525, 210/528, 529, 530, 532.1

[56] References Cited

U.S. PATENT DOCUMENTS

| | | | |
|---|---|---|---|
| 2,525,842 | 10/1950 | Thompson et al. | 210/528 |
| 2,624,704 | 1/1953 | Fischer et al. | 210/528 |
| 2,635,757 | 4/1953 | Walker | 210/528 |
| 3,166,502 | 1/1965 | Kelly | 210/528 |
| 3,216,570 | 11/1965 | Cunetta | 210/528 |
| 3,486,628 | 12/1969 | Darby | 210/528 |
| 4,000,075 | 12/1976 | Wooh | 210/525 |
| 4,222,879 | 9/1980 | Hill | 210/525 |
| 5,219,470 | 6/1993 | Bradley et al. | 210/528 |
| 5,340,485 | 8/1994 | Bradley et al. | 210/528 |

OTHER PUBLICATIONS

"Evaluating Scraper Designs", by Orris E. Albertson, Robert W. Okey, Water Environment & Technology Magazine, vol. 4, No. 1, Jan., 1992.

*Primary Examiner*—Christopher Upton
*Attorney, Agent, or Firm*—Kokjer Kircher Bowman & Johnson

[57] ABSTRACT

A sludge collector for removing sludge from the bottom of a tank for clarifying wastewater includes an elongate curved housing placed on the bottom of the tank, with the focus of the curve being the center of the floor, the housing defining an interior cavity, and a plurality of relatively small inlets spaced along the length of the housing for the introduction of sludge from the sludge blanket. The inlets are disposed adjacent the floor to remove the most concentrated sludge therefrom. The cross-sectional area of the housing increases from the ends to the midpoint, where an outlet pipe removes the sludge from the cavity under positive hydraulic pressure and applied negative pressure. The sludge collector is designed for most efficient use with spiral or curved scraper blades in a cylindrical clarifying tank.

12 Claims, 9 Drawing Sheets

SLUDGE COLLECTION APPARATUS AND METHOD

Matter enclosed in heavy brackets [ ] appears in the original patent but forms no part of this reissue specification; matter printed in italics indicates the additions made by reissue.

FIELD OF THE INVENTION

The present invention relates to solid-liquid separation, and particularly to apparatus and methods for removing and/or collecting sludge from primary or secondary clarifiers in sewage treatment plants.

BACKGROUND OF THE INVENTION

Improving sewage treatment efficiencies and plant capabilities has been the subject of numerous innovations in the past few decades because of burgeoning human populations and increasingly strained capabilities of existing plants. In conventional sewage treatment plants, the sewage is received and coarsely filtered through a bar screen or the like to remove relatively large objects. The sewage is then introduced into a primary clarifier, which generally comprises a tank, either circular or rectangular, in which gravity causes solid particles suspended in the liquid to settle out onto the bottom of the clarifier tank. Clarified liquid at the top of the tank flows over a weir at the tank edge into a launder, from which it is transported to further processing stages. The sludge, or settled solids at the bottom of the tank, is moved by hydraulic pressures, scraper arms, and gravity into a hopper from which the sludge is transported to further treatment stages.

The liquid wastewater effluent from the primary clarifier is then mixed with solid particles consisting primarily of micro-organisms (collectively called "activated sludge") to form an activated sludge mixed liquor. This liquor is introduced into an aeration or biological basin or equivalent structure where it is aerated with air or oxygen to encourage the growth and reproduction of the micro-organisms, which feed on and remove pollutants and organic matter from the wastewater. This biological aeration or oxidation process typically takes 2 to 24 hours.

After aeration, the liquor, now consisting primarily of water with a high admixed concentration of micro-organisms in small particulate or floc form, is introduced into a secondary clarifier.

The secondary clarifier is similar to the primary clarifier with some important differences. The solids suspended in the mixed liquor influent to the secondary clarifier (mixed liquor suspended solids, or MLSS) principally comprise micro-organisms, most of which will be collected and recycled to the aeration treatment stage. Since the solids settling to the floor of the secondary clarifier collectively are, in effect, a culture of respiring micro-organisms, they must be removed within 40 to 90 minutes of residence within the sludge blanket in order to avoid deterioration, gasification, and solids loss. At the same time, the sludge must be allowed enough residence time, at least 50 to 80 minutes, within the sludge blanket to compress and concentrate as much as possible into a thickened sludge mass to minimize the sludge volume to be recycled.

A prevalent problem in sludge removal from secondary clarifiers is that the removed sludge is unduly dilute by 1) removal before the sludge has concentrated sufficiently, and 2) "short-circuiting" of influent mixed liquor into the sludge outtake path, i.e., the influent wastewater breaks through the sludge blanket and flows directly into the hopper.

A large portion of activated sludge is recycled from the secondary clarifier to the biological basin. The more dilute this return activated sludge, the more must be recycled, creating a higher total volume of clarifier influent which reduces efficiency and strains the capacity of the treatment mechanisms. The maintenance of a high concentration of mixed liquor suspended solids in the biological basin and secondary clarifier influent while maintaining a low volume of return activated sludge depends on the production of a highly concentrated return activated sludge in the secondary clarifier.

The return activated sludge volume typically comprises on the order of 30 to 45 percent of the total clarifier influent feed volume.

Table 1 shows the effect on flux rate and efficiency of some different return activated sludge concentrations.

TABLE 1

Effect of RSS on RAS/Q Ratio and Solids Flux Rate

| | Case | | | |
|---|---|---|---|---|
| | A | B | C | D |
| Q ($m^3/s$) | 0.8 | 0.8 | 0.8 | 0.8 |
| MLSS (mg/L) | 3.500 | 3.500 | 3.500 | 3.500 |
| RSS (mg/L) | 8.000 | 10.000 | 12.000 | 15.000 |
| RAS ($m^3/s$) | 0.62 | 0.43 | 0.33 | 0.24 |
| Q + RAS ($m^3/s$) | 1.42 | 1.23 | 1.13 | 1.04 |
| RAS/Q Ratio | 0.78 | 0.54 | 0.41 | 0.30 |
| Flux Rate ($kg/m^2 \cdot hr \times 10^3$) | 429 | 372 | 341 | 314 |

Q=plant influent rate; MLSS=mixed liquor suspended solids concentration; RSS=return activated sludge concentration: RAS=return activated sludge rate; Flux Rate=activated sludge load, expressed as kg of dry solids/square meter/hour.

It is well known in the art that minimizing flux and total flow input (Q+RAS) by maximizing concentration of return activated sludge, such as in Cases C and D, increases the capacity and performance of a clarifier. Most prior art clarifier mechanisms operate in the range of Cases A and B.

Some prior art systems increase the depth of the sludge blanket to produce a more concentrated underflow of return sludge, but that tactic often results in excessive sludge inventory, and subsequent loss of efficiency in removing suspended solids from the liquid effluent overflowing the clarifier.

U.S. Pat. No. 2,820,758 to Rankin (1952) describes a system of V-shaped scrapers to collect activated sludge, with uptake pipes removing the sludge collected between the scrapers. Rankin's system is effective in withdrawing a substantial portion of the sludge before deterioration, but the sludge taken through the uptake pipes has a low concentration, requiring the recycling of 75 to 125 percent of the sludge to maintain desirable mixed liquor suspended solid concentrations of 2500 to 4000 mg/L and results in a correspondingly decreasing operating efficiency. Additionally, Rankin's system is relatively inflexible in handling the changing nature of solids loading (flux) over a 24-hour period.

Another design of rapid sludge removal, described in Clarifier Design—Manual of Practice FD-8 (1985), Facilities Development of the Water Pollution Control Federation, Alexandria, Va., substitutes a rotating hollow tube collector in place of scrapers. Orifices in the tube withdraw activated sludge for return to the biological basin. This system is designed for use with relatively flat clarifier floors and possesses the same deficiencies of the Rankin system.

Most clarifiers in the prior art have used a rectangular hopper located in the floor near the center of the tank for the collection of sludge. It has been found that the sludge flow into the hopper due to the scrapers usually accounts for only 15 to 25 percent of total sludge underflow. The balance must be hydraulically driven to the hopper. Since the overlying liquid is often 0.5 to 1.5 meters above the hopper, and the concentrated sludge flow cannot accelerate sufficiently to satisfy the sludge volume being withdrawn, short-circuiting often results.

It has also been found that sludge flow is effected by the Coriolis effect of fluid flow, i.e., a gravitational effect tending to counter-clockwise spiral flow to a central discharge in the northern hemisphere, clockwise in the southern hemisphere.

OBJECTS AND SUMMARY OF THE INVENTION

It is an object of the present invention to provide improved sludge collection apparatus and methods.

It is a further object of the invention to provide such apparatus and methods which increase clarifier efficiency.

It is also an object of the present invention to provide such apparatus and methods which increase the concentration or density of removed sludge in a sewage treatment clarifier.

It is another object of the invention to provide such apparatus and methods which allow for reducing the amount of activated sludge necessary for recycling from a secondary clarifier to an aeration basin.

It is a further object of the invention to provide such apparatus and methods for rapidly transferring settled sludge from the outer edge of a circular clarifier toward its center.

It is still another object of the invention to provide such apparatus and methods which reduce short-circuiting of influent wastewater into a clarifier's sludge collection device.

It is also an object of the invention to maintain clarifier sludge inventory within a desirable range.

It is a further object of the invention to enhance hydraulic effects and the Coriolis effect in sludge collection.

In a first aspect of the invention, a wastewater clarification apparatus comprises a tank adapted for holding wastewater, the tank including a generally cylindrical sidewall, an open top, and a floor; an input through which influent wastewater is supplied to the tank; a rake arm disposed within the tank and adapted for rotational movement around the tank's cylindrical axis; a mechanism for rotating the rake arm; an elongate scraper blade oriented with its proximal end oriented generally toward the center of the tank and its distal end oriented generally toward the sidewall, the scraper blade being disposed adjacent the rank floor and attached to the rake arm for movement therewith, such that the scraper blade transports or moves sludge settled out of the wastewater; and a sludge collector disposed near the tank floor. The sludge collection includes a generally arc-shaped housing with its focus located approximately at the center of the tank, the housing defining an interior cavity therein; at least one inlet leading through the housing into the cavity for transportation of sludge from the tank to the cavity; and an outlet leading through the housing from the cavity for transportation of sludge from the cavity. In a preferred embodiment, the housing curves almost completely around the center of the tank and the cross-sectional area of the housing increases from its ends to its midpoint, with a plurality of inlets disposed along the length of the housing.

In a second aspect of the invention, a method for clarifying wastewater and transporting the resulting settled sludge includes the steps of: supplying the wastewater to a generally cylindrical clarification tank; allowing solids to settle out of the wastewater to the floor of the tank to form sludge; moving the sludge toward a curved sludge collector disposed near the floor of the tank; moving the sludge from the tank floor into the sludge collector at a plurality of points along the sludge collector; and removing the sludge from the sludge collector.

BRIEF DESCRIPTION OF THE DRAWINGS

These and other objects, aspects, and embodiments of the present invention are described herein with reference to the attached drawing figures, of which.

DETAILED DESCRIPTION OF THE INVENTION

Figure 1:
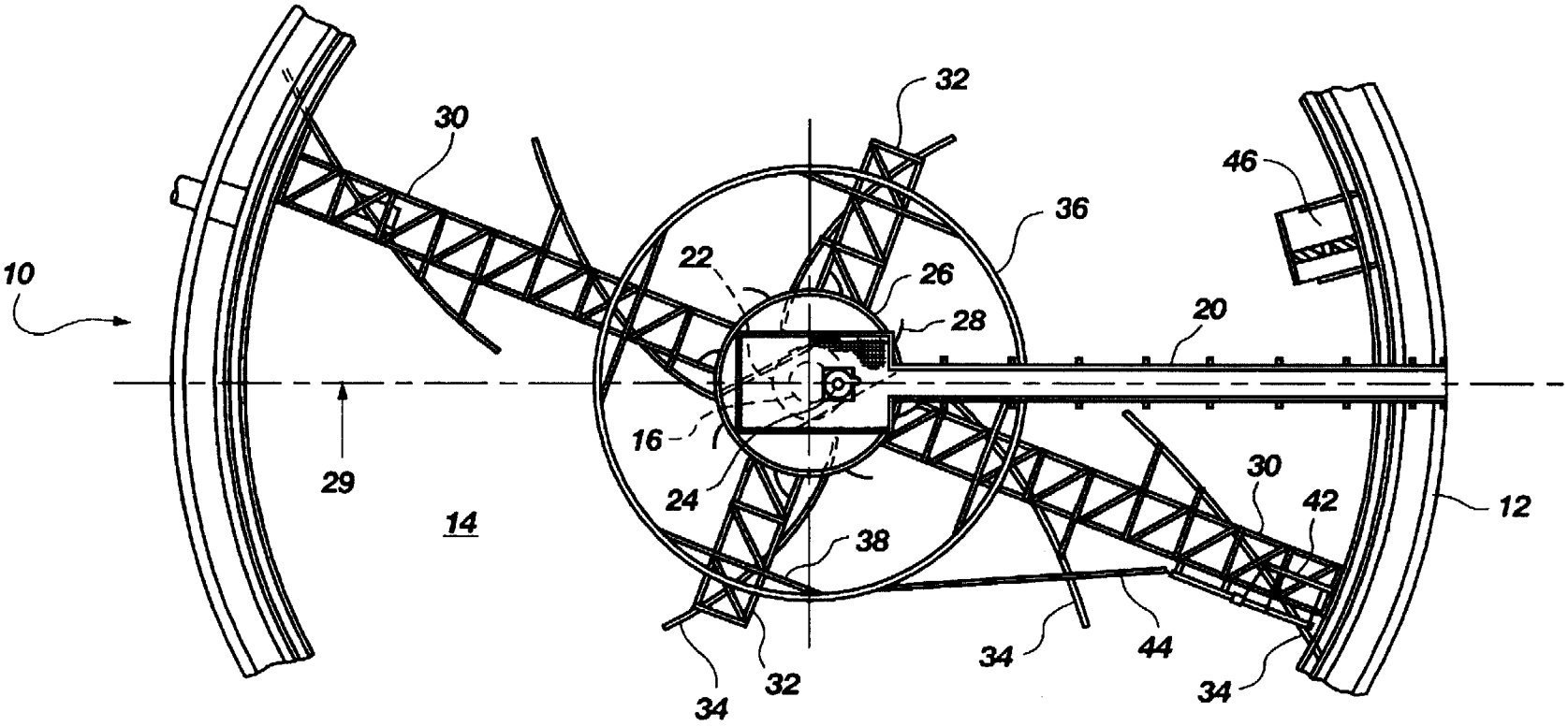
FIG. 1 is a top plan view of an example of a sewage treatment clarifier according to the invention.
Figure 2:
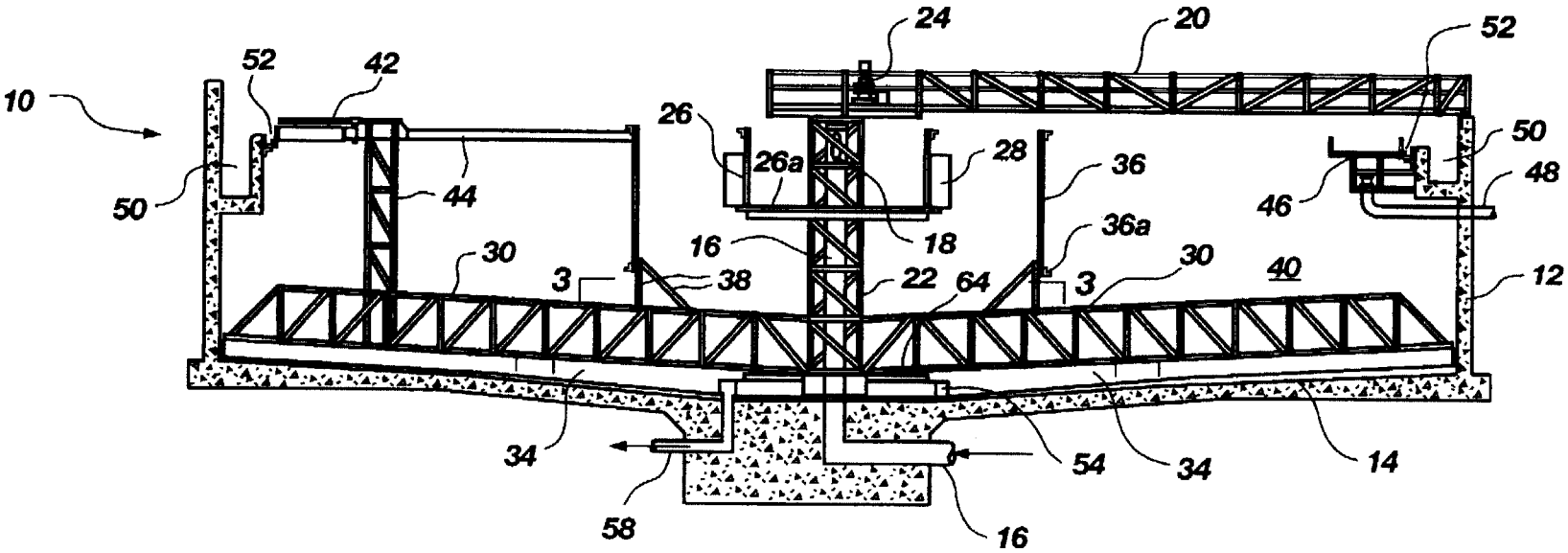
FIG. 2 is a side view in cross section of the clarifier of FIG. 1, with the rake arms having undergone approximately 160 degrees of rotational motion.

FIGS. 1 and 2 are views of an example of a secondary wastewater clarifier comprising an upright generally cylindrical tank 10 with an open top and closed bottom, the tank including an upright side wall 12 and a floor 14 which slopes slightly downwardly from its periphery to its center causing the floor to be generally frustoconical. The floor may be flat in connection with the Rankin scraper mechanism or other scraper mechanisms if desired. The tank is preferably constructed primarily of concrete, but may be constructed of other water-impervious materials such as steel.

A feed line 16 leads to the center bottom of the tank and then vertically through the center of the floor 14 to the top of the tank. The feed line carries influent wastewater to the tank 10 from prior treatment stages. A plurality of ports 18, through which the influent wastewater enters the tank, are disposed near the top of the feed line 16 at such a height that they are at or near the top wastewater line when the tank is filled and operating. The size and number of ports will vary according to the application, as is known to those skilled in the art.

A bridge 20, constructed of suitably strong and rigid material such as steel, is disposed over the top of the tank from the sidewall 12 to the top of the feed line 16 for access to the center of the tank. A vertically oriented rotatable cage 22 comprising a plurality of steel members is disposed beneath the bridge 20 and is placed coaxially to the vertical portion of the influent feed line 16. The cage 22 is adapted to rotate around the feed line, and is powered by a drive motor 24 disposed on the access bridge 20.

A generally cylindrical energy dissipating inlet 26 is disposed at the top of the tank around the feed line 16. The energy dissipating inlet 26 has an open top and a closed bottom 26a by which it is attached to the cage 22, thereby being adapted to rotate therewith. The inlet 26 extends in the embodiment shown from the top down about one-quarter height of the tank. A plurality of ports and accompanying directional fins 28 are disposed around the periphery of the energy dissipating inlet 26 for passage of wastewater. The inlet 26 reduces energy and currents in influent wastewater introduced into the tank through the feed line ports 18 by containing it and constricting its passage into the tank through the ports and fins 28. The fins are curved in the same direction of the rotational movement of the cage 22, shown by arrow 29 in FIG. 1, to reduce rotational current of the wastewater.

It is desirable to minimize as much as possible any energy and resulting currents in the tank wastewater with the inlet 26 and other means in order efficiently to clarify the wastewater. Nevertheless, a slight outward current from the center to the periphery of the tank is needed for the clarification process to function. Alternative inlet constructions and energy dissipation devices will be apparent to those skilled in the art in light of this disclosure.

Rake arms 30 and 32 are disposed near the bottom of the tank. They are attached at a proximal end to the cage 22 and radially extend toward the sidewall 12. Sludge scrapers 34 are attached to the rake arm bottoms and extend to the floor 14 of the tank. The scrapers 34 are preferably tapered curved or spiral scraper blades, as shown, but may comprise other arrangements, such as multiple straight blade scrapers, if desired. The scrapers are preferably tapered in sloped floor clarifiers, i.e., they increase in depth toward the center to accommodate an increasing sludge depth and thereby uniformly transport it toward the center.

As the cage 22 rotates under power of the drive motor 24, the rake arms and scrapers move along the floor 14 of the tank, continually transporting the collected sludge toward the center of the tank.

Rake arms 30 and their attached scrapers extend the full length from the center to the sidewall of the tank, while rake arms 32 and their attached scrapers, called secondary scrapers, extend only partially from the center to the wall. Secondary scrapers are generally only used in clarifiers more than about 35 meters in diameter, and may extend from the center to 25 to 100 percent of the tank radius.

A generally cylindrical influent feedwell 36 extends downwardly from the top to about one-half the height of the tank, and is attached to and supported by the rake arms 30 and 32 by support members 58. The feedwell 36 forces influent wastewater from the energy dissipating inlet 26 to pass downwardly under the feedwell bottom 36a and outwardly into the clarification zone 40, thereby minimizing the amount of wastewater passing over the top edge of the clarifier without having had sufficient residence time in the clarification zone 40.

A radial skimmer blade 42 is disposed adjacent the sidewall 12 at the top of the tank and is supported by support members 44 from a rake arm 30 and the feedwell 36. Thus the skimmer 42 moves with the rake arm in a circle around the periphery of the tank skimming floating solids, or scum, from the surface of the wastewater and depositing them into a scum box 46 at the end of each revolution. The scum then travels through an outlet 48 to further processing stages. Various designs of skimmers and scum boxes are known in the art.

A launder 50 is mounted around the periphery of the tank on the sidewall 12 for the removal of clarified effluent wastewater from the top of the tank. An adjustable weir 52 is provided on the launder to balance the rate of liquid removed from the tank periphery, as is known in the art.

Figure 3:
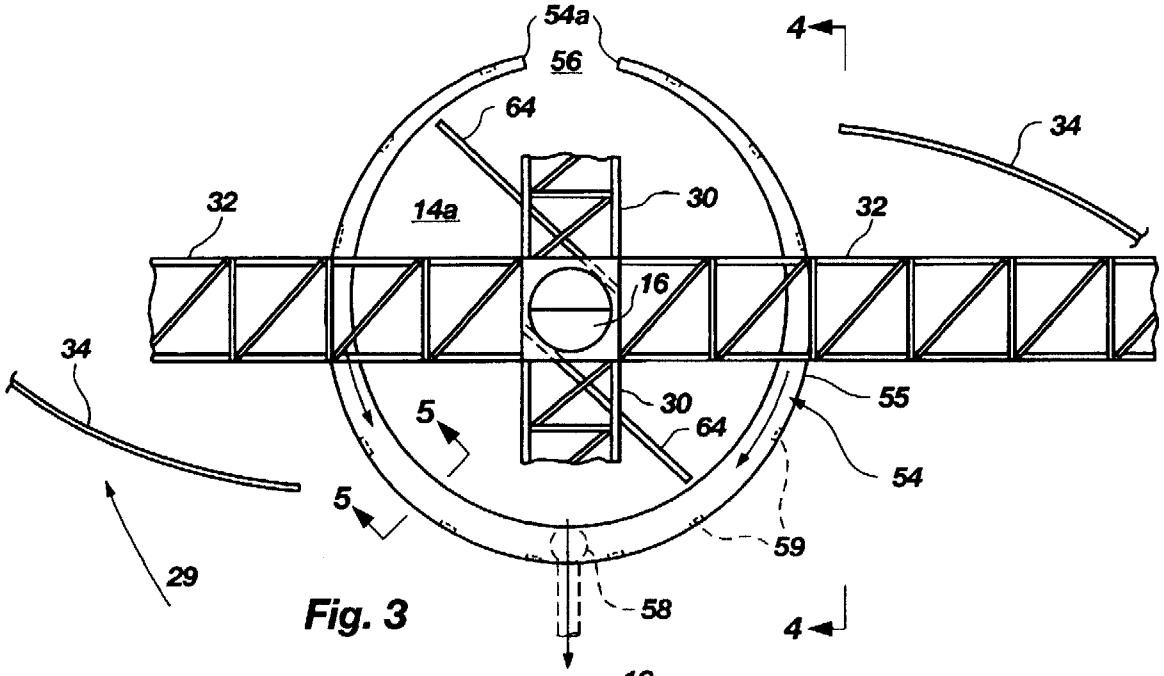
FIG. 3 is a top view in cross section along line 3—3 in FIG. 2.
Figure 5:
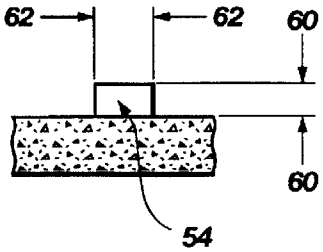
FIG. 5 is a view along line 5—5 in FIG. 3.
Figure 4:
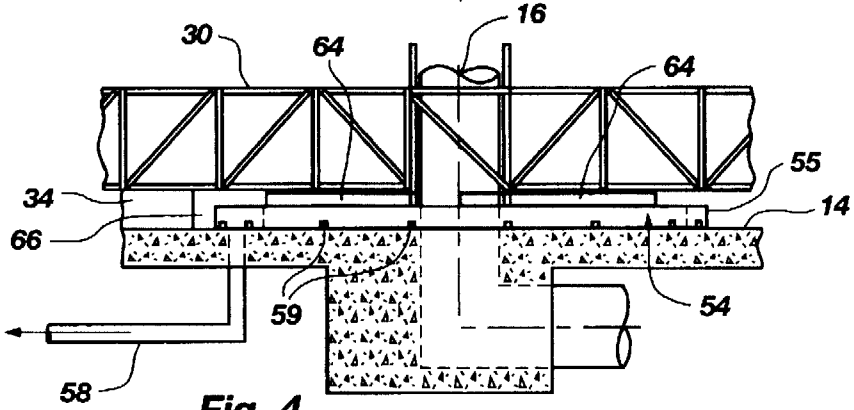
FIG. 4 is a view along line 4—4 in FIG. 3.

Referring now generally to FIG. 2 and particularly to FIGS. 3 through 5, an embodiment of a sludge collector according to the present invention is shown. The sludge collector comprises a constant velocity collection chamber 54 disposed on the floor 14. The chamber 54 comprises a cavity within an exterior housing 55 constructed of suitably strong material such as steel. The chamber 54 is curved around the feed line 16 except in the area 56, shown in FIG. 3, thereby describing an incomplete circular path preferably 10 to 20 percent of the radial distance from the center of the tank with its focus being at or near the tank center. The chamber has ends 54a in the area 56 to eliminate a dead zone. An outlet pipe 58 at the chamber's midpoint transports sludge from the chamber.

A plurality of preferably relatively small sludge inlets 59 comprising apertures in the housing 55 are disposed around the periphery of the chamber 54 for the uniform withdrawal of concentrated sludge from the bottom of the sludge blanket. The inlets 59 are preferably of uniform size and spacing such that they each withdraw the same amount of sludge, and are placed adjacent or near the floor 14 to limit localized sludge blanket drawdown and short-circuiting and increase collected sludge concentrations. The exact size and spacing of the inlets will vary according to the type, size, shape, and function of the clarifier.

The chamber 54 is preferably maintained under a negative pressure produced by a suitable mechanism such as a pump or sludge decanting arrangement (not shown), which will be apparent to those skilled in the art in light of this disclosure. The negative pressure is adjustable in the preferred embodiment in order to vary the sludge underflow rate removed through the outlet pipe 58, as desired. In secondary clarifiers, a major portion of the activated sludge is recycled at controlled rates to the biological aerators by conventional means while the remainder is directed to sludge treatment stages.

The sludge collected in the chamber 54 will move generally from its ends 54a, increasing in volume of each inlet, to the outlet pipe 58 under the differential pressure of the pump or the decant device. While the height of the chamber 54, shown by arrows 60 in FIG. 5, is constant, the width, shown by arrows 62 in FIG. 5, preferably increases from the ends 54a of the chamber to the outlet pipe 58 to accommodate the differing amounts of sludge in the chamber. As shown, the width increases continually, but may alternatively be made to increase in stages, e.g., from inlet to inlet.

The increasing size of the chamber 54 as it goes from the ends 54a to the outlet pipe 58 allows the sludge inside to travel from the ends to the outlet pipe at approximately a constant velocity. Those skilled in the art will recognize that other constructions of constant velocity chambers are possible, such as, e.g., increasing the height of the chamber. Variants of constant velocity collection chambers have been used in other applications such as rotary distributors for trickling filters and suction header collectors for flat floor sludge removal.

Though a curvilinear collection chamber is preferred because of hydraulic principles, any collection chamber which bends generally around the central tank column will work, such as square, hectagonal or octagonal designs.

A portion 14a of the floor 14 is raised inside the sludge collection chamber 54. Scrapers 64 attached beneath the rake arms 30 remove accumulated sludge from the central portion 14a of the floor and urge it outwardly toward the sludge collector inlets 59. In the preferred embodiment, the scrapers 64 have a reverse orientation from the main scrapers 34 in order to urge sludge outwardly from the center of the tank instead of inwardly from the sidewall.

An inlet scraper 66, shown in FIG. 4, is provided on one of the rake arms 30 adjacent the periphery of the chamber 54. The inlet scraper rotates with the rotation of the rake arm 30 to prevent large solids accumulation and blockage of the sludge inlets 59.

Figure 6:
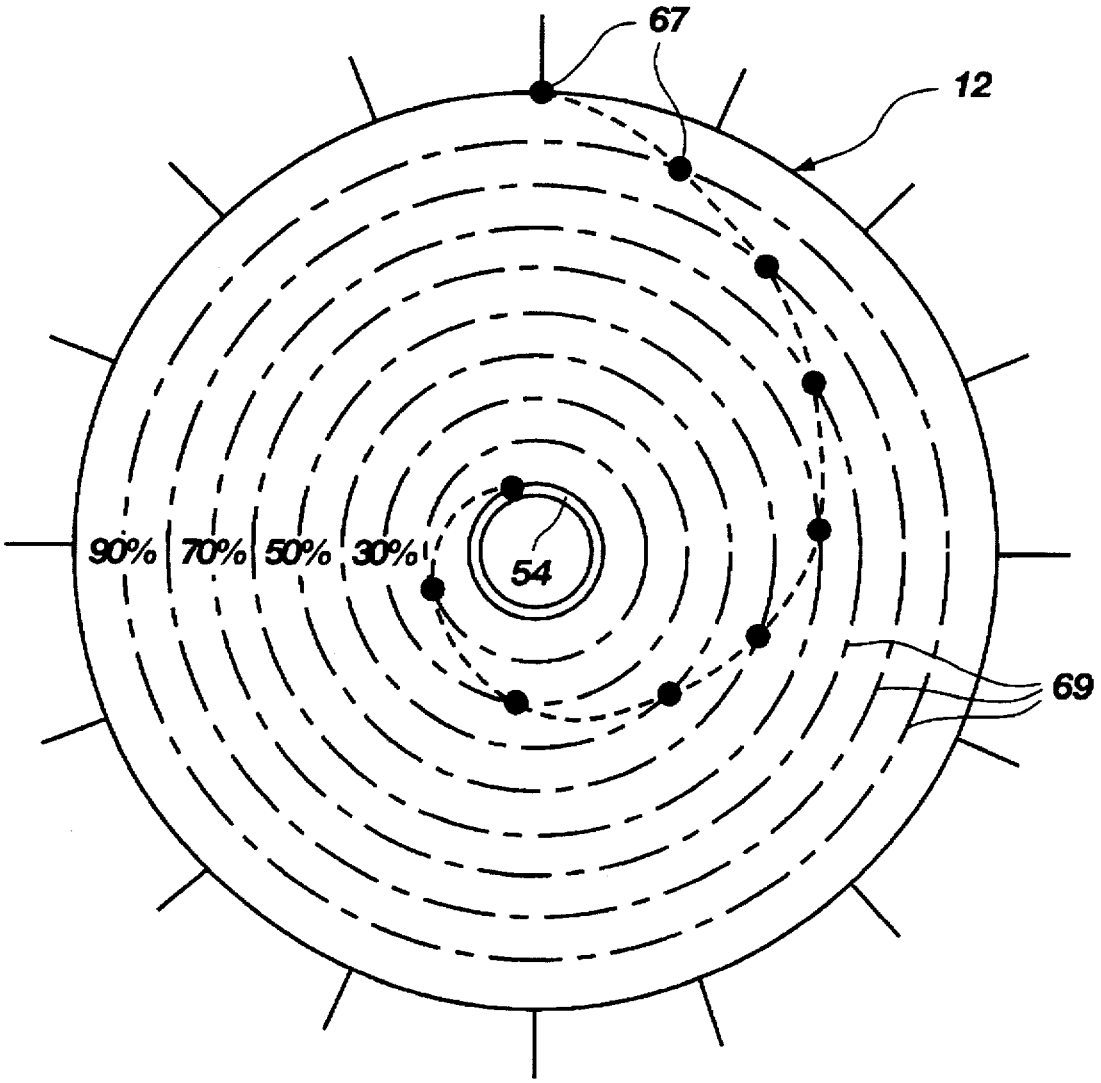
FIG. 6 is a schematic view of the travel path of a sludge particle from the outer edge of the clarifier of FIG. 1 to a sludge collector according to the present invention.

FIG. 6 shows the flow path over time of a concentrated sludge particle 67 in the clarifier shown in FIGS. 1 through 5 from the tank sidewall 12 to where the particle is adjacent the sludge collection chamber 54. Circles 69 schematically indicate 10 percent radial increments of the tank radius from its center to the sidewall 12. As shown in FIGS. 1 through 4, the clarifier's scraper blades are preferably curved or spiral and constructed of sufficient depth to contain the sludge being transported. Additionally, the scraper blades are preferably oriented to rotate counter-clockwise, if the sewage treatment facility is located in the northern hemisphere, or clockwise, in the southern hemisphere, to take advantage of the Coriolis effect.

The transport efficiency and capacity of the spiral scrapers are a function of the mechanism design and operating characteristics, of which some key factors are the number of blades, the angle of blade attack, the tapered depth of the blades, the blade tip speed and the relative depth of sludge to scraper blade depth. The scrapers and sludge collection device shown in FIGS. 1 through 5 are designed to be harmonious such that neither component unduly restrains sludge flow along the tank floor 14 through the sludge collection chamber 54 to the outlet pipe 58. At the same time, the sludge must be retained in the tank long enough sufficiently to concentrate it, about 50 to 80 minutes. The sludge transport time to the collector should not fall below that interval, nor should it exceed it, in order to keep the sludge fresh.

In the clarifier embodiment shown in FIGS. 1 through 5, the transport time will be approximately 61 minutes given the following characteristics:

| | |
|---|---|
| Tank diameter | = 61 m |
| Blade hp speed | = 4.5 m/min |
| Angle of blade attack | = 30 degrees |
| Tapered blade depth | = 300 to 1000 mm |
| Transport efficiency | = 0.70 |

Figure 7:
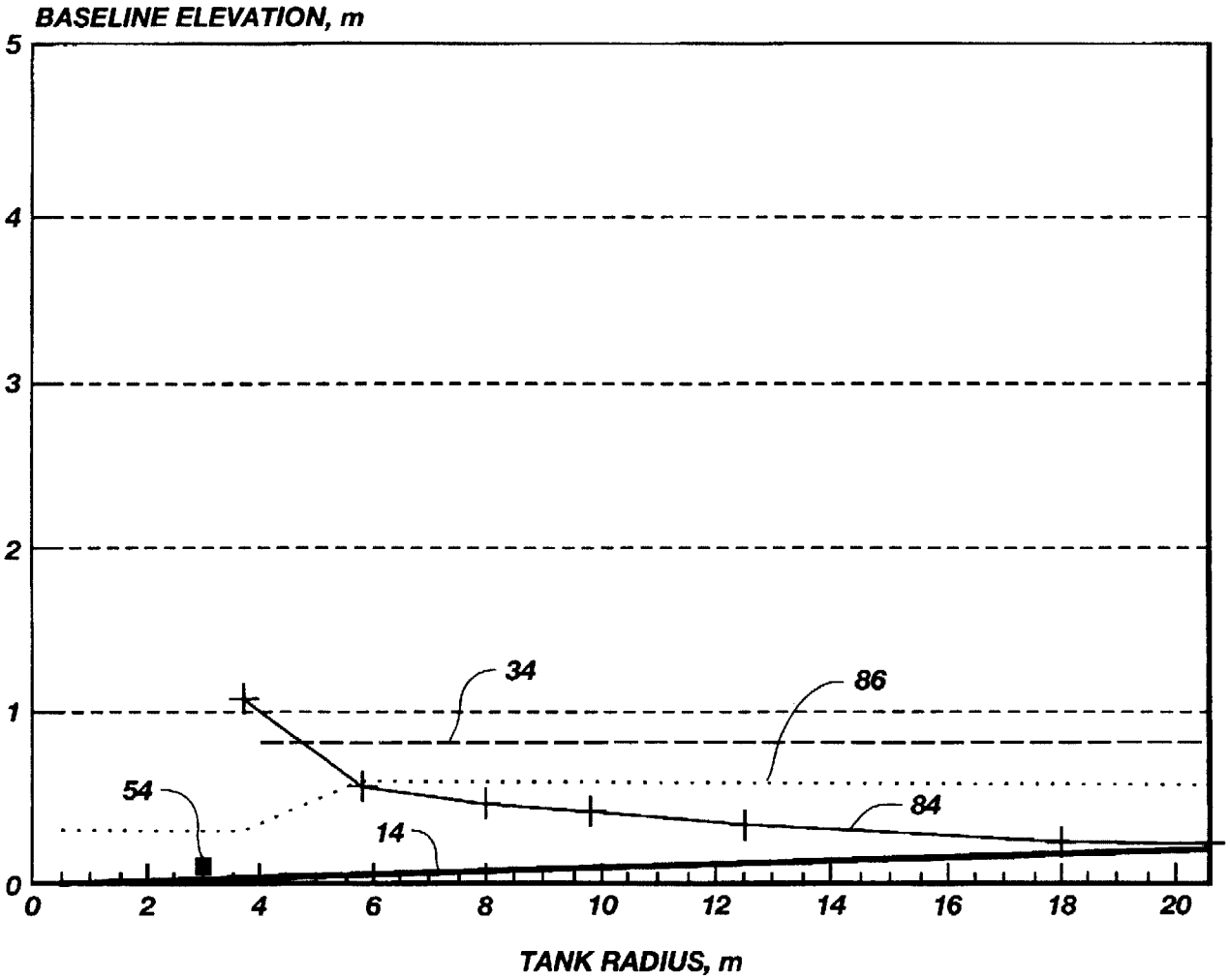
FIG. 7 is a schematic view of sludge and scraper blade depths in the clarifier of FIG. 1.

FIG. 7 schematically depicts what effect the sludge collector of the present invention has on the depth of the sludge blanket on the tank floor 14 given the above clarifier characteristics. The solid line 84 depicts the calculated depth of the sludge blanket in front of a scraper, schematically depicted by dashed line 34, without the sludge being withdrawn from the tank. As the accumulated sludge is forced toward the center of tank and thus a smaller zone, the sludge depth increases geometrically. From this calculation the optimum design of the scrapers and the location and design of the sludge collector can be established. The addition of the sludge chamber 54 creates hydraulic effects which reduce the depth of the resulting sludge blanket 86 near the center of the tank and increase the depth away from the tank's center.

Figure 8:
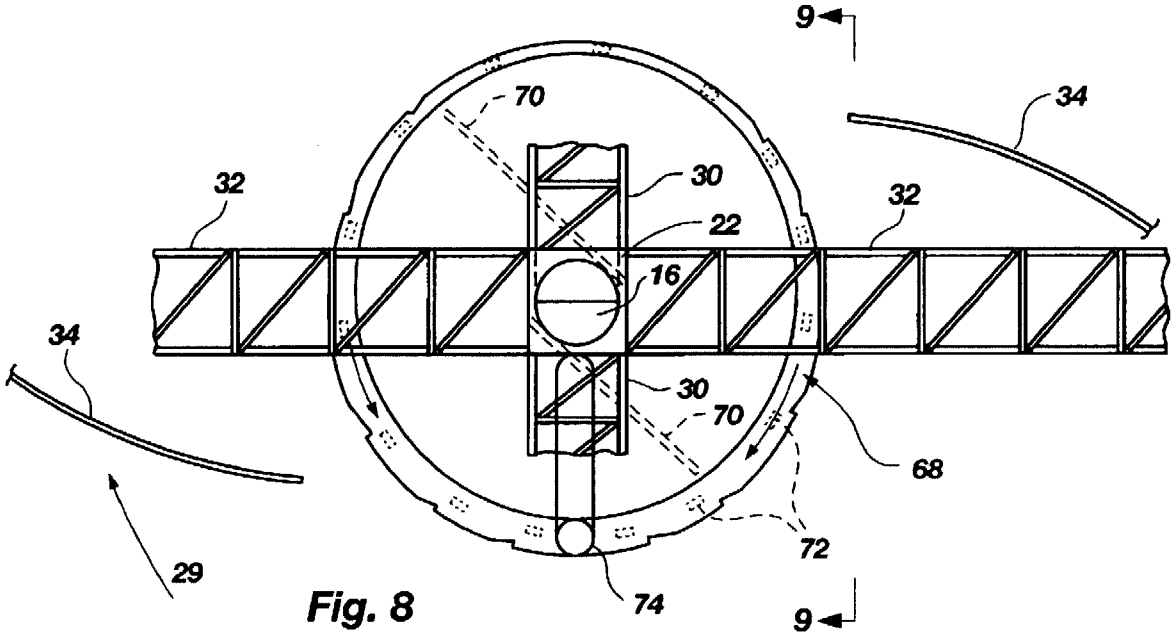
FIG. 8 is a top view in cross section of the clarifier of FIG. 1 showing a second embodiment of a sludge collector according to the invention.
Figure 9:
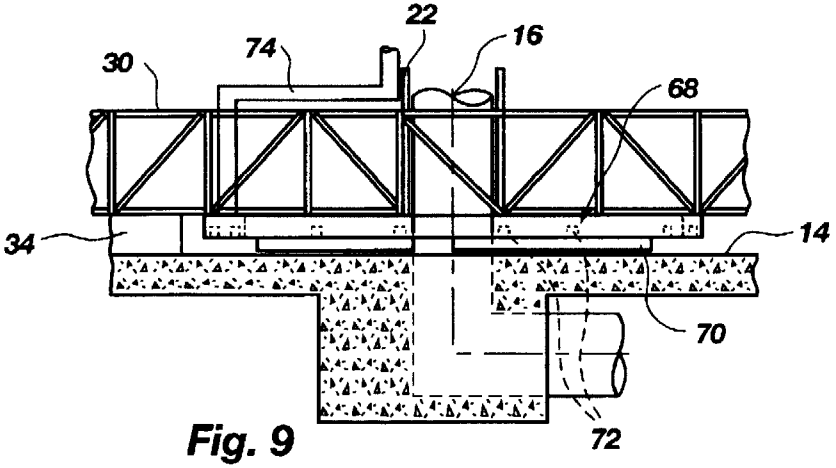
FIG. 9 is a view along line 9—9 in FIG. 8.

FIGS. 8 and 9 show another example of a sludge collection device according to the invention comprising an annular collection chamber 68 of increasing width, similar to the chamber 54 in FIGS. 3 through 5, except that the chamber 68 is completely annular and attached to the underside of the rake arms 30 and 32, causing it to rotate therewith, instead of attached to the tank floor. Additionally, the width of the chamber 68 increases incrementally in stages instead of continuously. A pair of reverse direction center scrapers 70, corresponding to the scrapers 64 in FIGS. 3 and 4, are disposed under the chamber 68 to urge sludge collected in the center of the tank floor outwardly toward the chamber 68.

A plurality of sludge inlets 72, of similar spacing and size to the inlets 59 in FIGS. 3 and 4, are disposed on the bottom of the chamber 68, rather than on its side as in FIGS. 3 and 4, for the collection of concentrated sludge from the sludge blanket on the tank floor. An outlet pipe 74 leads from the widest portion of the chamber upwardly to the center cage 22, where the collected sludge travels to further processing stages or recycled to the aeration basin.

FIGS. 8 and 9 illustrate that the sludge collector of the invention need not be located directly on the tank floor, though the sludge inlets should be located near, either above or below, the floor for the collector to operate efficiently. Additionally, though the incomplete annular shape of the chamber 54 in FIGS. 3 and 4 is preferred and causes more efficient sludge flow to the outlet pipe, the chamber may be a complete annulus as shown in FIGS. 8 and 9, if desired. There may be 2 to 4 uptake pipes 74 utilized in a retrofit improvement, if desired. The inlets 72 may be advantageously grouped together ahead of the scraper 34 to take advantage of the pressure caused by their rotational movement, if desired.

Figure 10:
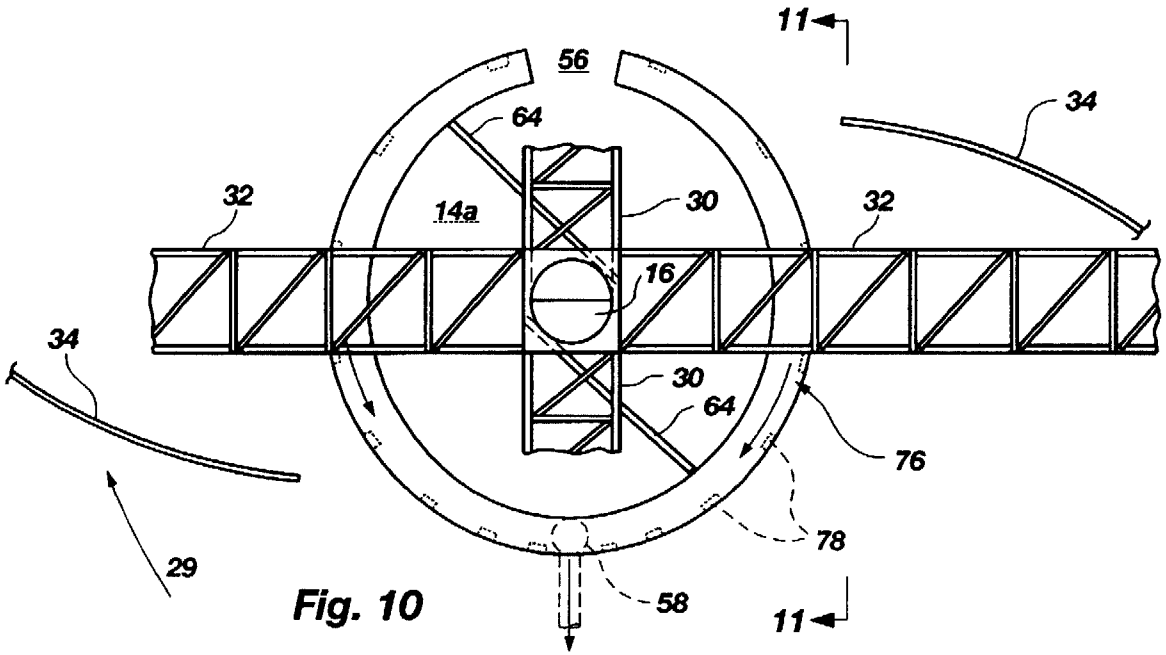
FIG. 10 is a top view in cross section of the clarifier of FIG. 1 showing a third embodiment of a sludge collector according to the invention.
Figure 11:
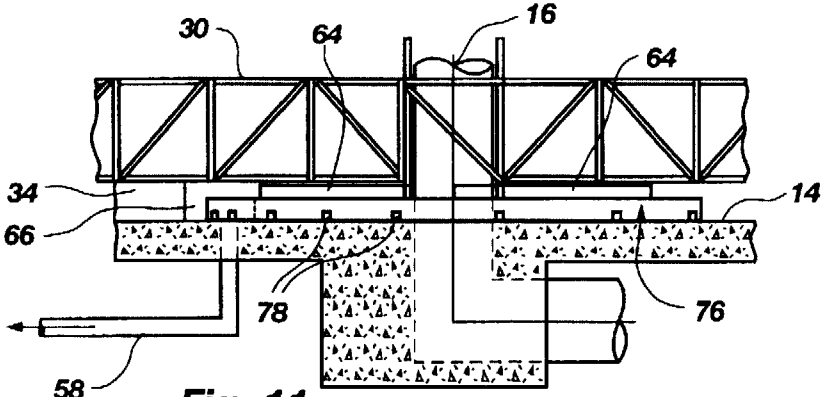
FIG. 11 is a view along line 11—11 in FIG. 10.

Referring now to FIGS. 10 and 11, another example of a sludge collector according to the invention is shown which is similar to the collector shown in FIGS. 2 through 5 except that its chamber 76 has a uniform cross-section throughout and its sludge inlets 78 are spaced non-uniformly. Since the chamber 76 is not a constant velocity collection chamber, the inlets 78 are spaced closer nearer the outlet pipe 58 and farther apart away from the outlet pipe in order to ensure a uniform withdrawal of sludge from the sludge blanket. The positive hydraulic and/or negative supplied pressure urging the sludge in the chamber toward the outlet pipe is greater nearer the outlet.

Figure 12:
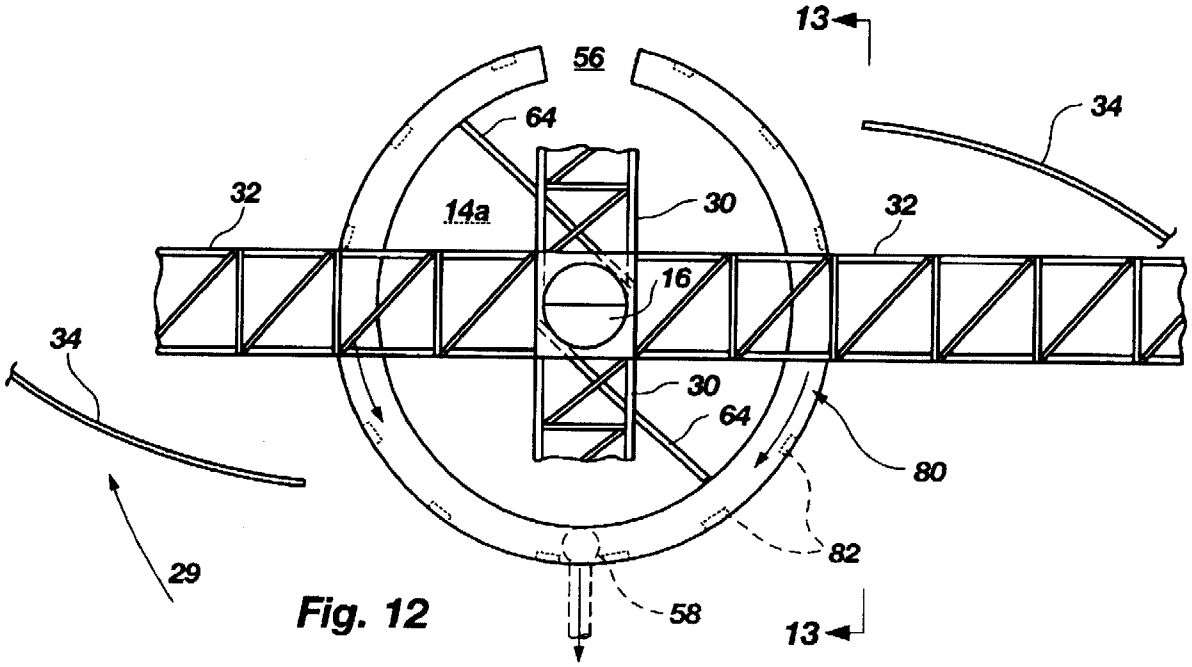
FIG. 12 is a top view in cross section of the clarifier of FIG. 1 showing a fourth embodiment of a sludge collector according to the invention.
Figure 13:
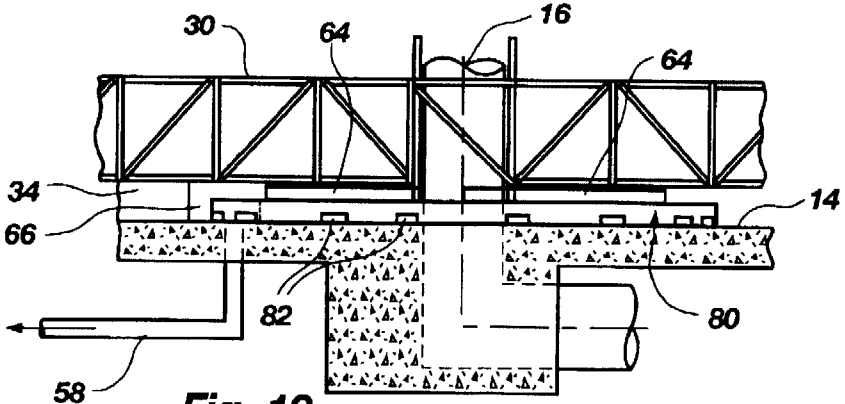
FIG. 13 is a view along line 13—13 in FIG. 12.

Referring now to FIGS. 12 and 13, another example of a sludge collector according to the invention is shown which is similar to the collector shown in FIGS. 2 through 5 except that its chamber 80 has a uniform cross-section throughout and its sludge inlets 82 are of non-uniform size. Since the chamber 80, like the chamber 76 in FIGS. 10 and 11, is not a constant velocity collection chamber, the inlets 82 are larger nearer the outlet pipe 58 and smaller away from the outlet pipe in order to ensure a uniform withdrawal of sludge from the sludge blanket. The increasing size of the inlets toward the outlet pipe serves the same function as the decreasing inlet spacing in FIGS. 10 and 11.

Both inlet sizing and spacing may be varied according to the needs of the specific application.

Figure 14:
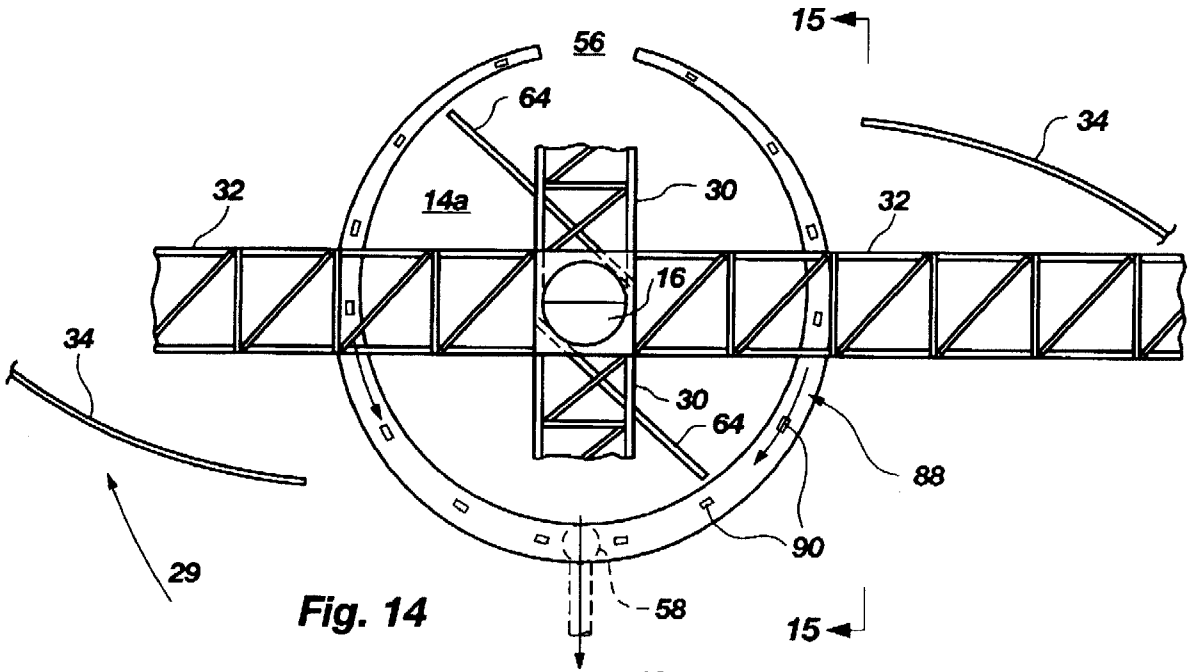
FIG. 14 is a top view in cross section of the clarifier of FIG. 1 showing a fifth embodiment of a sludge collector according to the invention.
Figure 15:
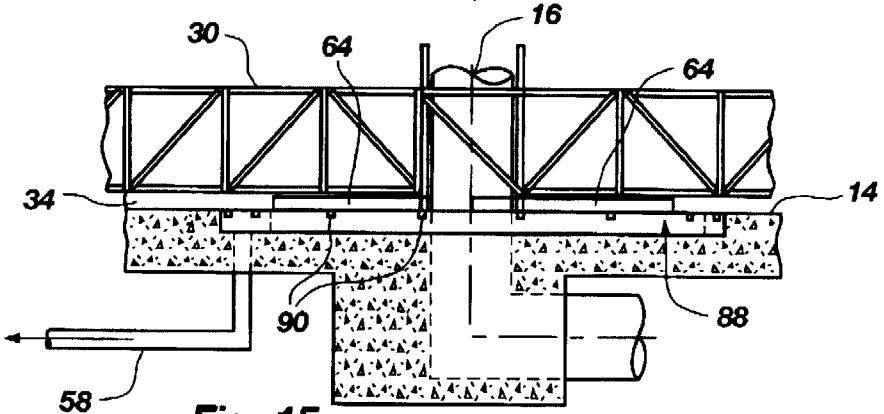
FIG. 15 is a view along line 15—15 in FIG. 14.

Referring now to FIGS. 14 and 15, a sludge collector is shown having a chamber 88 similar to the chamber 54 in FIGS. 3 through 5 except that instead of being disposed on top of the floor 14, the chamber 88 is imbedded in the floor 14 with its top being flush therewith. In this case, the inlets 90 are disposed on top of the chamber for the collection of sludge.

A sludge collector of the present invention will tend to remove only the more concentrated sludge and will reduce short-circuiting of mixed liquor to the underflow due to the reduced quantity withdrawn at each inlet. The result is a more concentrated sludge underflow and a lower return flow rate. The collector 54 may also be located in a trench with the top inlets 90 located below the top of floor 14 and provide all the benefits set forth.

The following examples demonstrate different configurations of the sludge collector and scraper blades depending on clarifier tank conditions and process requirements.

EXAMPLE 1

CONVENTIONAL FLOOR SLOPE

A secondary clarifier tank of 40 m diameter, 4.75 m sidewater depth, and 6.0 m centerwater depth received 0.5 $m^3/s$ of mixed liquor wastewater having suspended solids (MLSS) of 3000 mg/L. Settling tests demonstrated that solids settle out of the mixed liquor to 12,000 mg/L suspended solids in the sludge, producing an underflow sludge volume of 0.167 $m^3/s$. A sludge collector of the type described in FIGS. 1 through 5 had an outside diameter of 0.15 percent of the tank diameter, or 6 m. The spiral scraper blades tapered from 200 mm deep at the sidewall to 750 mm deep near the sludge collector.

Since the depth of concentrated sludge (as measured near the center of the tank) could be 1.25 m without exceeding the conical zone of the tank, the number of sludge inlets in the sludge collector was minimized and the inlets were made relatively large. Eight uniformly spaced inlets were used, each 75 mm high and 275 mm long. Each inlet collected sludge at a rate of 0.021 m/s.

The sludge collection chamber cross-sectional area at its ends was approximately 21,000 $mm^2$, 275 mm high by 75 mm wide. The collector area increased to approximately 84,000 $mm^2$, 275 mm high by 300 mm wide, at the fourth inlet on each side of the outlet pipe. The flow volume was about 0.083 $m^3/s$ through the four inlets on each half of the chamber.

EXAMPLE 2

SHALLOW FLOOR SLOPE

A secondary clarifier tank of 40 m diameter, 4.75 m sidewater depth, 5.05 m centerwater depth, and floor slope of 0.015 m/m received 0.5 $m^3/s$ of mixed liquor wastewater having suspended solids (MLSS) of 3000 mg/L. The existing Rankin suction header sludge removal system was replaced by spiral scrapers and the central sludge collector of FIGS. 1 through 5.

The sludge collector had an outside diameter of 0.15 percent of the tank diameter, or 6 m. The spiral scrapers had a depth of 450 mm at the sidewall and 750 mm adjacent the collector. Concentrated sludge is thixotropic and tends to flow outward, but the deeper spiral scrapers continuously moved the sludge to the central sludge collector at a rate exceeding the sludge withdrawal rate.

The maximum sludge depth at the collector was in the range of 0.75 m. While the target sludge underflow density was 12,000 mg/L, the design allowed for lower concentrations given the shallow floor slope and limited sludge depth. The sludge collector was designed to remove a sludge volume of 0.200 $m^3/s$ at a 10,000 mg/L suspended solids concentration.

The sludge collector was fitted with 12 inlets with a total area of about 267,000 $mm^2$. Each opening was 75 mm high by 300 mm wide, 22,200 $mm^2$ area, with a sludge withdrawal velocity of 0.75 m/s. The collector had a cross-section of 24,000 $mm^2$, 300 mm high by 80 mm wide, at its ends, expanding to 134,000 $mm^2$, 300 mm high by 450 mm wide, at the sixth inlet on each side of the outlet pipe.

As will be appreciated by those skilled in the art in light of this disclosure, particularly the different embodiments of the sludge collector described above, various configurations of the collector's basic design are possible while retaining its advantages and remaining within the scope of the invention. The overall design of the described embodiments of the invention can be modified and varied while remaining within the scope of the invention as embodied in the appended claims.

I claim:

[1. In an apparatus for clarifying wastewater having a generally cylindrical tank with an open top and a closed bottom, a wastewater inlet for receiving influent wastewater into the tank, a rake arm mounted to rotate about a central axis of the tank, at least one scraper mounted on the rake arm and disposed adjacent the bottom of the tank for transport of sludge when the rake arm is rotated, and a wastewater outlet for discharging clarified effluent wastewater from the tank, an improved sludge collector comprising:

a generally bent elongate housing defining an interior cavity and disposed near the tank bottom, the housing being oriented in a generally horizontal plane and being bent generally around the tank's central axis;

a plurality of sludge inlets leading through the housing into the cavity and disposed so as to receive sludge directed toward the housing by the at least one scraper; and a sludge outlet leading through the housing from the cavity for transportation of sludge from the cavity.]

[2. The apparatus of claim 1 wherein the sludge inlets comprise apertures in the housing.]

[3. The apparatus of claim 1 wherein the housing is generally curvilinear with its focus at or near the tank's central axis, and the housing has first and second ends and the sludge outlet is disposed at approximately the midpoint of the housing's length, and wherein the cross-sectional area of the cavity is larger near the sludge outlet than at the ends of the housing.]

[4. The apparatus of claim 3 wherein the cavity's cross-section is approximately rectangular and its height is uniform throughout its length while its width increases from the ends to the midpoint of the housing.]

[5. The apparatus of claim 3 wherein the cavity's cross-sectional area gradually and uniformly increases from the ends to the midpoint of the housing.]

[6. The apparatus of claim 3 wherein the cavity's cross-sectional area increases in stages from the ends to the midpoint of the housing.]

[7. The apparatus of claim 3 further wherein the sludge inlets are of approximately uniform size and shape and spaced approximately uniformly along the length of the housing.]

[8. The apparatus of claim 1 wherein the housing is generally curvilinear with its focus at or near the tank's central axis, and the housing has first and second ends, and the sludge outlet is disposed at approximately the midpoint of the housing, and the cross-sectional area of the cavity is approximately uniform throughout its length, and wherein the sludge inlets are spaced along the length of the housing and increase in size from the ends to the midpoint of the housing.]

[9. The apparatus of claim 1 wherein the housing is generally curvilinear with its focus at or near the tank's central axis, and the housing has first and second ends, and the sludge outlet is disposed at approximately the midpoint of the housing, and the cross-sectional area of the cavity is approximately uniform throughout its length, and wherein the sludge inlets are disposed along the length of the housing, the spacing between the sludge inlets decreasing from the ends to the midpoint of the housing.]

[10. The apparatus of claim 1 wherein the housing is attached to the tank bottom and wherein the sludge inlets are disposed on a side of the housing adjacent the tank bottom.]

[11. The apparatus of claim 1 wherein the housing is attached to the rake arm and rotates therewith, and wherein the sludge inlets are disposed on the bottom surface of the housing.]

[12. The apparatus of claim 1 wherein the top of the housing is approximately flush with or slightly below the tank bottom and the sludge inlets are disposed on the top surface of the housing.]

[13. The apparatus of claim 1 wherein the housing is an annulus.]

[14. The apparatus of claim 1 further comprising means for applying a negative pressure on sludge inside the cavity to urge the sludge into the sludge outlet.]

[15. The apparatus of claim 1 wherein the housing is in the shape of an arc at an approximately uniform radial distance from the tank center of 10 to 20 percent of the rank radius.]

[16. The apparatus of claim 1 wherein the housing is in the shape of an arc at an approximately uniform radial distance from the tank center of 15 percent of the tank radius.]

[17. Wastewater clarification apparatus comprising:

a tank adapted for holding wastewater, the tank including a generally cylindrical sidewall, an open top, and a floor;

means for supplying influent wastewater into the tank;

means for removing effluent wastewater from the tank;

a rake arm disposed within the tank and adapted for rotational movement around the tank's central axis;

means for rotating the rake arm;

an elongate scraper blade oriented such that its proximal end is oriented generally toward the center of the tank and its distal end is oriented generally toward the sidewall, the scraper blade being disposed adjacent the tank floor and attached to the rake arm for rotational movement therewith, such that the scraper blade transports sludge settled out of the wastewater toward a sludge collector; and a sludge collector disposed near the tank floor comprising:

an approximately arc-shaped housing with its focus approximately at the center of the tank, the housing defining an interior cavity therein;

a plurality of inlets leading through the housing into the cavity for transportation of sludge from the tank to the cavity, the inlets being disposed so as to receive sludge transported by the scraper blade; and an outlet leading through the housing from the cavity for transportation of sludge from the cavity.]

[18. The apparatus of claim 17 wherein the floor is generally frustoconical with its center lower than its periphery and further comprising a plurality of scraper blades each curved from its proximal to its distal end, and wherein each scraper blade increases in depth toward its proximal end.]

[19. The apparatus of claim 17 further comprising a reversed scraper blade attached to the rake arm and disposed adjacent the floor between the center of the tank and the housing.]

[20. Method for clarifying wastewater and transporting resulting settled sludge comprising the steps of:

supplying the wastewater to a generally cylindrical clarification tank;

allowing solids to settle out of the wastewater to the floor of the tank to form sludge;

moving the sludge along the floor toward a curved sludge collector disposed near the floor of the tank around the central region of the tank;

moving the sludge from the central region of the tank floor into the sludge collector through a plurality of apertures along the sludge collector; and removing the sludge from the sludge collector.]

[21. The method of claim 20 wherein the step of moving the sludge from the central region of the tank floor into the sludge collector through a plurality of apertures includes uniformly moving the sludge through a plurality of inlets disposed in spaced arrangement along the length of the collector.]

[22. The method of claim 20 wherein the step of moving the sludge along the floor toward the curved sludge collector includes moving the sludge between the collector and the tank periphery inwardly and moving the sludge between the collector and the tank center outwardly.]

*23. In an apparatus for clarifying wastewater having a tank with an open top and a closed bottom, a wastewater inlet for receiving influent wastewater into the tank, a rake arm mounted to rotate about a central axis of the tank, at least one scraper mounted on the rake arm and disposed adjacent the bottom of the tank for transport of sludge when the rake arm is rotated, and an outlet for discharging clarified effluent wastewater from the tank, an improved sludge collector comprising:*

*a sludge collector housing defining a generally annular chamber adjacent the tank bottom, the housing being bent generally around the tank's central axis to locate said chamber a selected distance outwardly from said central axis;*

*a plurality of sludge inlets leading through the housing into the chamber and disposed so as to receive sludge directed toward the housing by the at least one scraper;*

*a sludge outlet extending from said chamber for transportation of sludge from the chamber; and*

*means for providing a pressure differential between said chamber and tank with the chamber pressure lower than the tank pressure to effect flow of the sludge through said inlets into the chamber.*

*24. The apparatus of claim 23, wherein said chamber has a cross-sectional area that increases toward said sludge outlet.*

*25. The apparatus of claim 24, wherein said chamber has a substantially rectangular cross-section having a height that is substantially constant and a width that increases toward said sludge outlet.*

*26. The apparatus of claim 24, wherein said sludge inlets are of approximately uniform size and are spaced uniformly apart along said housing.*

*27. The apparatus of claim 23, wherein said tank is generally cylindrical and said chamber is located outwardly from the tank's central axis a distance equal to about 10 to 20 percent of the tank radius.*

*28. Wastewater clarification apparatus comprising:*

*a tank adapted for holding wastewater, said tank having a side wall, an open top and a floor;*

*means for supplying influent wastewater into the tank;*

*means for removing effluent wastewater from the tank;*

*a rake arm disposed within the tank and adapted for rotational movement around the tank's central axis;*

*means for rotating the rake arm;*

*an elongate scraper blade oriented such that its proximal end is oriented generally toward the center of the tank and its distal end is oriented generally toward the side wall, the scraper blade being disposed adjacent the tank floor and attached to the rake arm for rotational movement therewith, such that the scraper blade transports sludge settled out of the wastewater toward a sludge collector; and*

*a sludge collector disposed near the tank floor comprising:*

*an arcuate housing defining a generally annular sludge collection chamber therein having a focus at said central axis, said chamber being spaced outwardly from said axis a distance equal to approximately 10–20 percent of the distance between said side wall and central axis;*

*a plurality of inlets to said chamber disposed to receive sludge transported by the scraper blade for directing the sludge into said chamber; and*

*an outlet from said chamber for transporting sludge therefrom.*

*29. The apparatus of claim 28, wherein the floor is generally frustoconical with its center lower than its periphery and further comprising a plurality of scraper blades each curved from its proximal to its distal end, and wherein each scraper blade increases in depth toward its proximal end.*

*30. The apparatus of claim 28, further comprising a reversed scraper blade attached to the rake arm and disposed adjacent the floor between the center of the tank and the housing.*

*31. The apparatus of claim 28, wherein said chamber is spaced outwardly from said axis a distance equal to approximately 10–20 percent of the distance between said side wall and central axis.*

*32. Method for clarifying wastewater and transporting resulting settled sludge comprising the steps of:*

*supplying the wastewater to a generally cylindrical clarification tank;*

*allowing solids to settle out of the wastewater to the floor of the tank to form sludge;*

*moving the sludge along the tank floor toward an annular sludge collector disposed near the tank floor and spaced outwardly from the center of the tank;*

*moving the sludge from the tank floor into the sludge collector through a plurality of apertures spaced along the sludge collector; and*

*removing the sludge from the sludge collector.*

*33. The method of claim 32, wherein the step of moving the sludge along the floor toward the sludge collector includes moving the sludge between the collector and tank periphery inwardly and moving the sludge between the collector and the tank center outwardly.*

*34. The method of claim 32, wherein said sludge collector is spaced outwardly from the center of the tank a distance of approximately 10% to 20% of the tank radius.*

* * * * *